UNITED STATES PATENT OFFICE.

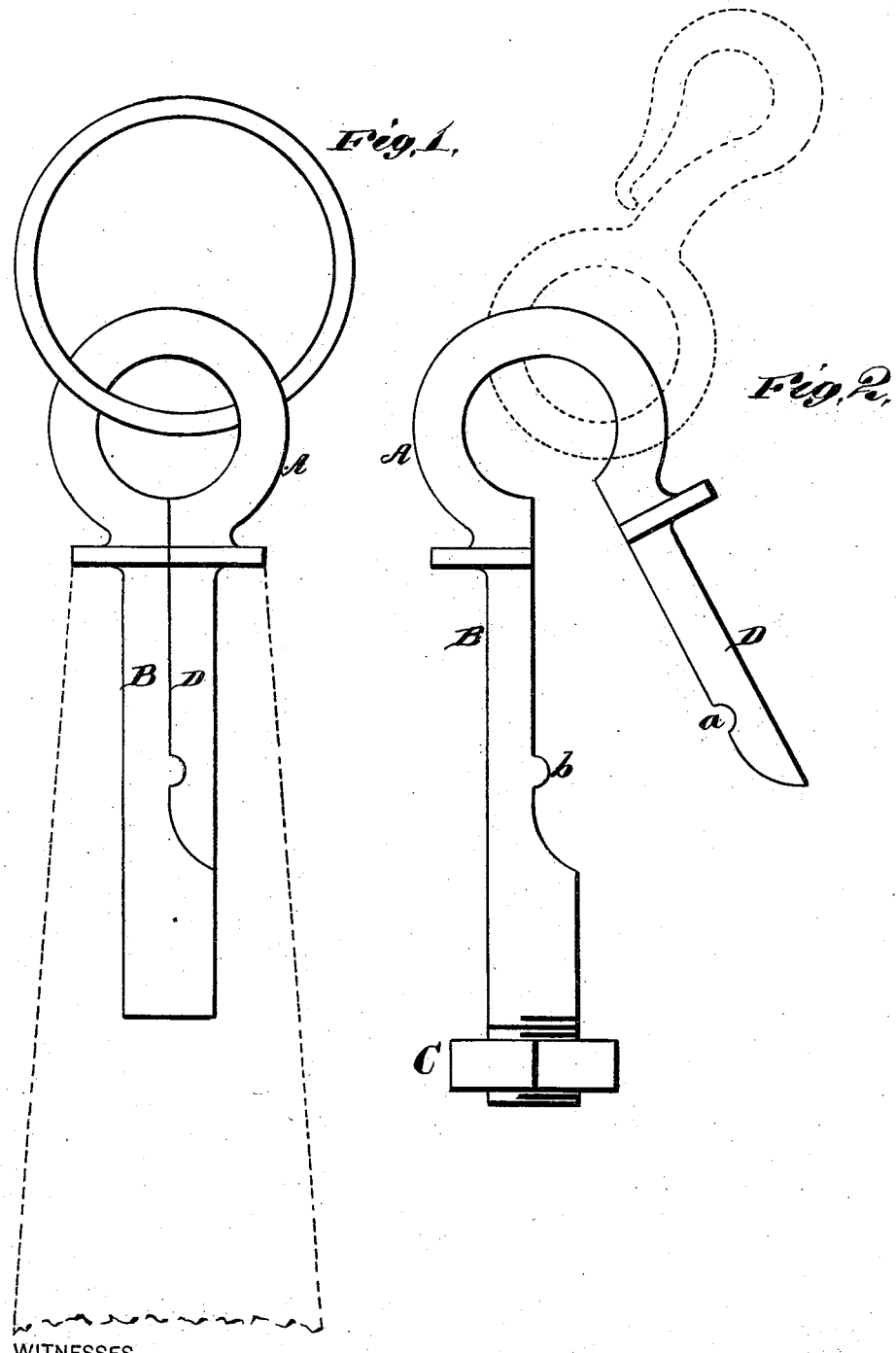

C. STEWART ELLS, OF MOLINE, ILLINOIS.

IMPROVEMENT IN EYEBOLTS FOR WHIFFLETREES.

Specification forming part of Letters Patent No. 191,411, dated May 29, 1877; application filed April 28, 1877.

*To all whom it may concern:*

Be it known that I, C. STEWART ELLS, of Moline, in the county of Rock Island and State of Illinois, have invented a new and valuable Improvement in Lock-Eyebolt; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my lock-eyebolt closed, and Fig. 2 is a view of the same open.

The nature of my invention consists in the construction of a lock-eyebolt designed for the purpose of connecting the outer ends of ordinary whiffletrees with the draft hooks or rings, and their central connection with eveners or triple-trees, as the case may require, or for other purposes where the invention may be applied.

The annexed drawing, to which reference is made, fully illustrates my invention.

A represents the eye of the eyebolt, formed with a shank, B, of suitable diameter and length to pass through the desired part of whiffletrees or eveners, and be securely fastened with a screw-nut, C, or any other ordinary means.

The eye A is made open, and formed with an extension, D, from the curve running parallel with, and forming a part of, the shank B of the eyebolt, said extension D being of sufficient length to be held tight against the shank when driven in the proper place.

The extension D of the eye is further provided with a transverse notch or recess, a, on its inner side, to match a corresponding projection, b, formed on the shank, thus forming a lock-joint of the two surfaces when closed together.

By this construction rings, hooks, or other connections may be removed from and replaced in said eyebolt with greater convenience, thereby cheapening their manufacture. I prefer to manufacture them of cast malleable iron. I do not confine myself to that particular mode, as it is practicable to forge the same from wrought-iron.

What I claim as new, and desire to secure by Letters Patent, is—

1. The extension D of the eye, provided with the notch or recess a, in combination with the projection b on the shank, substantially as and for the purpose described.

2. The combination of the shank B, having projection b, the eye A, and the extension D, with notch or recess a, all substantially as and for the purpose described.

In testimony that I claim the above I have hereunto subscribed my name in the presence of two witnesses.

C. STEWART ELLS.

Witnesses:
    D. H. ROBBINS,
    F. H. HEAD.